Oct. 11, 1966 D. R. KIMBERLIN 3,277,982
SELF-ENERGIZING DISC BRAKE
Filed Nov. 23, 1964 2 Sheets-Sheet 1

INVENTOR.
Dan R. Kimberlin
BY
Donald P. Selvecki
HIS ATTORNEY

INVENTOR.
Dan R. Kimberlin
BY
Donald P. Selwicki
HIS ATTORNEY

United States Patent Office 3,277,982
Patented Oct. 11, 1966

3,277,982
SELF-ENERGIZING DISC BRAKE
Dan R. Kimberlin, Saginaw, Mich., assignor to General Motors Corporation, Detroit, Mich., a corporation of Delaware
Filed Nov. 23, 1964, Ser. No. 412,997
7 Claims. (Cl. 188—152)

This invention relates to vehicle braking mechanisms and more particularly to a disc braking system that has a self-energizing feature.

It is an object of the present invention to provide an improved disc brake mechanism that incorporates the advantages of a caliper type design while being self-energizable.

It is another object of the present invention to provide an improved disc braking mechanism that is self-energizable wherein the components and apparatus for bringing about the self-energization are integral to a single support member.

It is still another object of the present invention to provide an improved disc brake mechanism which is self-energizable regardless of the direction of rotation of the disc.

Further objects and advantages of the present invention will be apparent from the following description, reference being had to the accompanying drawings wherein a preferred embodiment of the present invention is clearly shown.

Figure 1:
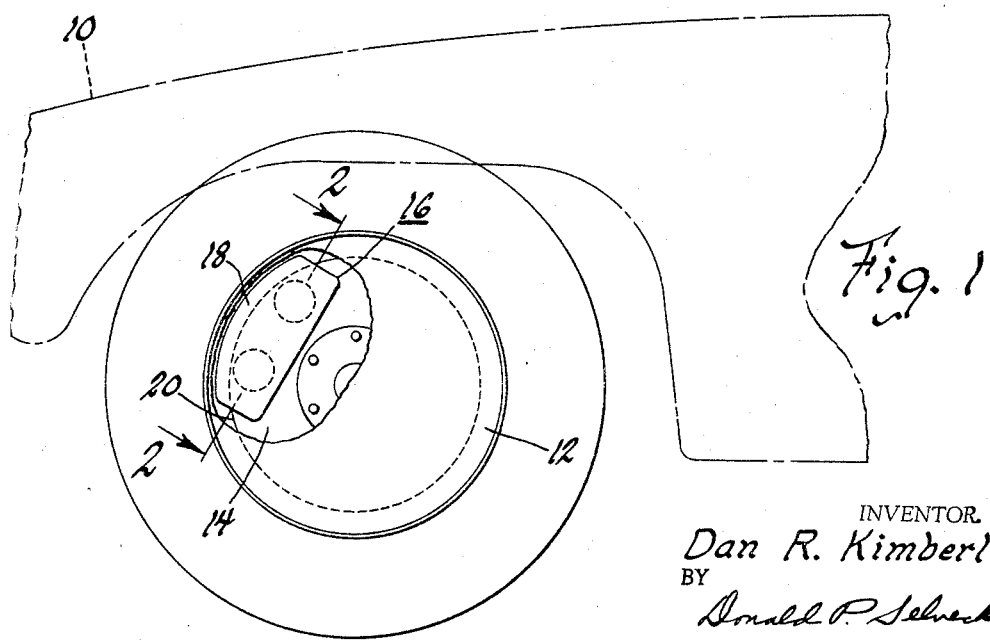
FIGURE 1 is an elevational view of the subject invention shown in its operative environment.

Referring to FIGURE 1, an automobile 10 having a wheel 12 carries a disc 14 that is engageable by a disc braking mechanism 16.

Figure 3:
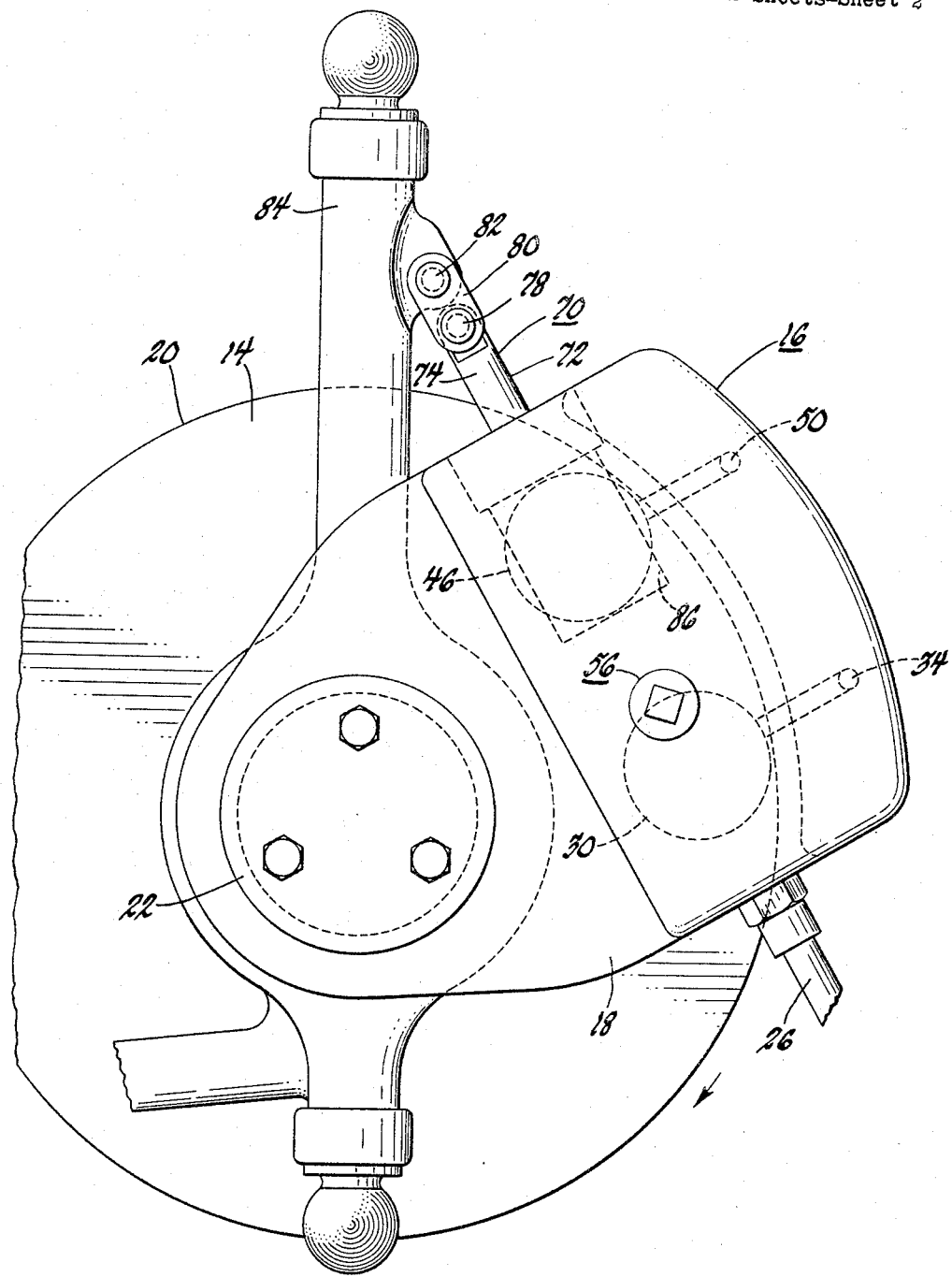
FIGURE 3 is a sectional view taken along line 3—3 of FIGURE 2.

Referring to FIGURE 3, the disc braking mechanism 16 is seen to be a caliper type wherein a support 18 is placed on either side of a periphery 20 of the disc 14. The support means 18 is pivotally mounted on a hub 22 which is fixed with respect to the rotatable disc 14.

Figure 2:
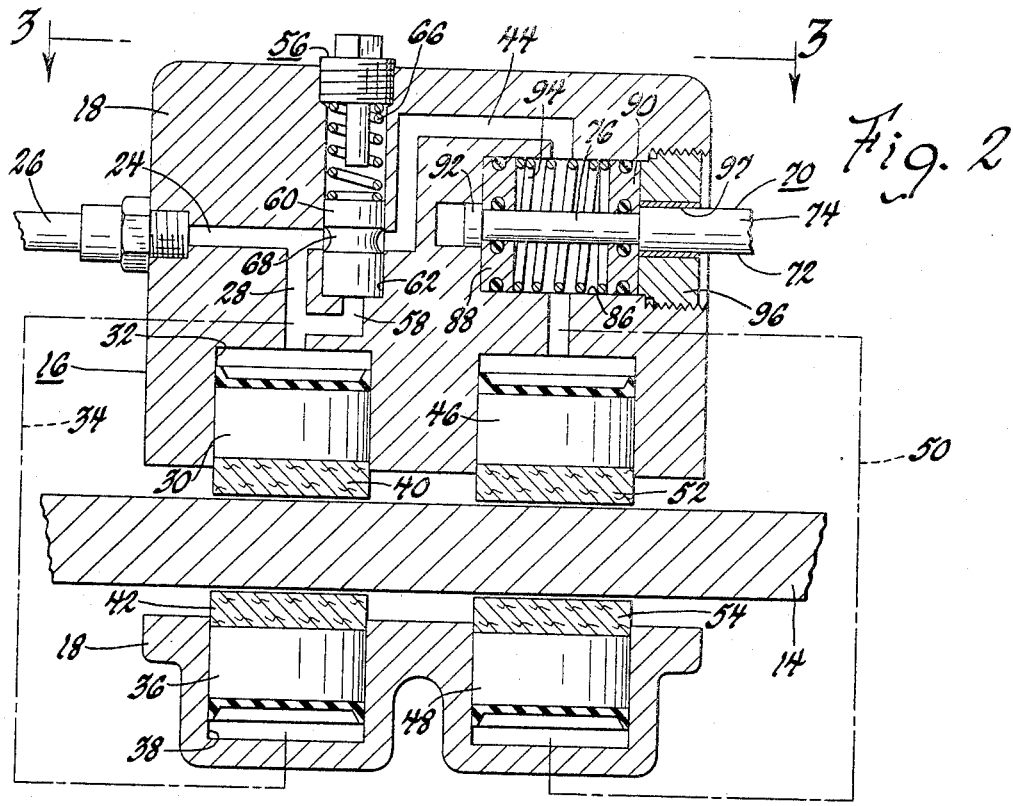
FIGURE 2 is a sectional view taken along line 2—2 in FIGURE 1.

Referring to FIGURE 2, the support member 18 is a unitary body having a fluid passage 24 in communication with an inlet 26 from a fluid pressure source, typically, a master cylinder of common design. The passage 24 supplies hydraulic fluid under pressure through a passage 28 to a piston 30 slidably disposed in a bore 32. As diagrammatically shown in FIGURE 2, the passage 28 supplies fluid under pressure through a passage 34 integrally formed in the support 18 to a piston 36 slidably disposed in a bore 38. The piston 30 and the piston 36 are hereinafter described as first piston means or as a first series of piston means. Friction elements 40 and 42 are carried by the pistons 30 and 36 respectively, and are hereinafter referred to as first friction elements or a first series of friction elements. It is seen that the friction elements 40 and 42 in a poised position are located in juxtaposition to the disc 14 and as therein disposed are adapted to frictionally engage the disc 14 in response to a pressure buildup in the passages 34 and 28.

A passage 44 communicates fluid under pressure from the passage 24 to a piston 46 and to a piston 48 through a passage 50 diagrammatically shown. Friction elements 52 and 54 referred to herein as second friction elements or second series thereof are carried by the pistons 46 and 48 respectively, hereinafter referred to as second piston means or as second series of piston means in given instances.

A valve generally designated by the numeral 56 is disposed in the passage 44 and is responsive to an increased pressure in a passage 58 to isolate the passage 44 from the passage 24. The valve 56 generally comprises a piston 60 slidably disposed in a bore 62 and biased away from a threaded plug 64 by spring 66. A peripheral groove 68 formed in the piston 60 when appropriately positioned provides a path for fluid flow between the passages 24 and the passage 44.

A link means generally designated by the numeral 70 is disposed in another portion of the passage 44 between the valve 56 and the pistons 46 and 48. The link means 70 generally comprises a shaft 72 having a larger diameter portion 74 and a smaller diameter portion 76. Referring to FIGURE 3, the larger diameter portion 74 terminates in a pivot 78 engaging a pivot link 80. A pivot 82 carried by a steering knuckle 84 engages the pivot link 80 on an opposite end. It is understood that the steering knuckle 84 is a relatively fixed portion of the vehicle and the disc brake mechanism 16 is prevented from being freely rotatable on the hub 22 by the link means 72.

Referring to FIGURE 2, a bore 86 formed as an enlarged portion of the passage 44 carries opposed pistons 88 and 90, sometimes referred to herein as opposed force inducing means. The pistons 88 and 90 are also slidable on the smaller diameter 76 of the shaft 72. Retaining flange 92 holds the piston 88 on the smaller diameter 76 against the bias of a spring 94 tending to keep the pistons 88 and 90 apart. A threaded plug 96 closes off the bore 86 and has an aperture 97 adapted to slidably carry the larger diameter 74 of the shaft 72. It is clear that when the passage 44 is isolated from the passage 24 by a movement of the piston 60, a closed system results wherein pressure can be intensified by a decreasing in size of the space between the opposed pistons 88 and 90 by movement of the pistons 88 and 90 against the bias of the spring 94. It is noted that the pistons 88 and 90 are retained on one side by an end wall of the bore 86 and on an opposite side by the threaded plug 96.

In operation, when it is desired to apply the disc brakes illustrated herein, a pressure increase is generated in a master cylinder and communicated through the inlet 26 to the passage 24. Pressure will thereafter be communicated through the inlets 28 and 34 to the pistons 30 and 36 as well as through the peripheral groove 68 into the passage 44 ultimately to the pistons 46 and 48. This pressure buildup will cause a movement of the friction elements 40, 42, 52 and 54 into frictional engagement with the disc 14. It is noted that the piston 60 has a pressure exerted on its end facing the passage 58. As the pressure increase continues, sufficient pressure is exerted on the piston 60 through the passage 58 to overcome the biasing force of the spring 66. Movement of the piston 60 will continue in the bore 62 until communication is cut off between the passage 24 and the passage 44. At this point, it is to be noted that the portion of the system to the right of the piston 60 as viewed in FIGURE 2 becomes a closed system at a given pressure. Pressure will continue to increase in the passages 28 and 34 driving the friction elements 40 and 42 more firmly into engagement with the disc 14.

Referring now to FIGURE 3, it will be assumed that the direction of the rotation of the disc 14 is clockwise as viewed therein. As the friction elements 40 and 42 comprising the first series of friction elements contact the disc 14 in conjunction with the friction elements 52 and 54 comprising the second series of friction elements a servo action takes place which is demonstrated by a movement of the disc brake mechanism 16 in a clockwise direction. In viewing FIGURE 3, it is clear that the shaft 72 engages the link 80 and ultimately the steering knuckle 84 and therefore resists this movement.

Referring to FIGURE 2, the shaft 72 will remain stationary, but the plug 96 will drive the piston 90 on the diameter 76 causing the piston 90 to move towards the piston 88 against the force of the spring 94. The piston 88 being restrained by the flange 92 will remain fixed with respect to the shaft 72. Therefore the space between the pistons 88 and 90 will decrease and the fluid contained therebetween under pressure will be increasingly pressurized. This intensification of the trapped pressure will drive the pistons 46 and 48 more firmly into frictional engagement with the disc 14 thereby realizing a self-energizing capability for the disc brake system described herein.

When pressure is released in the inlet 26 from the fluid pressure source, the passage 58 will be depressurized and the spring 66 will become dominant in the bore 62 driving the piston 60 to the poised position seen in FIGURE 2. When the peripheral groove 68 is appropriately aligned with the passage 24 to provide a path for fluid communication from the passage 24 to the passage 44 the area of trapped pressure will be relieved of pressure and the support 18 will be returned to a poised position by the force of the spring 94 acting against the piston 90. At this point in the operation all pressure in the system is relieved and the pistons 30, 36, 46 and 48 move out of frictional engagement with the disc 14 thereby releasing the brakes.

It is understood that if the direction of rotation of the disc 14 is in a counterclockwise fashion as viewed in FIGURE 3, the same self-energizing action will take place in that the piston 88 in place of the piston 90 will move relative to the shaft 74. Therefore the present invention has a self-energizing capability regardless of direction of rotation of the disc 14 and thereby a portion of the forces generated in the braking action are put to use in assisting the positive pressure forces acting in a system to bring about a braking action. It is obvious that the degree of response experienced in the system described is able to be regulated by a change in the compressive force of the springs 66 and 94 as well as by an alteration of the physical dimensions of the pistons in the system. Therefore the invention as taught herein is equally adaptable for use with light weight or heavy duty vehicles without departing from the spirit of the inventive concept.

While the embodiment of the present invention as herein disclosed, constitutes a preferred form, it is to be understood that other forms might be adopted.

What is claimed is as follows:

1. Disc brake mechanism for a vehicle, said mechanism comprising: a rotatable disc; support means carried by the vehicle; fluid pressure source means in fluid communication with said support means; a first series of friction elements carried by said support means and engageable with said rotatable disc in response to pressure from said fluid pressure source means; a second series of friction elements carried by said support means and engageable with said rotatable disc in response to pressure from said fluid pressure source means; first means carried by said support means in fluid communication with said fluid pressure source means and adapted to isolate pressure to said second series of friction elements from said first series of friction elements; and second means including opposed force inducing means, each of said opposed force inducing means being responsive to a servo action generated under different operating conditions to intensify the pressure on said second series of friction elements.

2. Disc brake mechanism for a vehicle, said mechanism comprising: disc means carried for rotation by a vehicle wheel; support means carried by a non-rotatable portion of the vehicle in juxtaposition to the disc means; a fluid pressure source in pressure communication with said support means; a first series of friction elements slidably carried by said support means and arranged to be driven into frictional engagement with said disc by pressure from said fluid pressure source; a second series of friction elements slidably carried by said support means and arranged to be driven into frictional engagement with said disc by pressure from said fluid pressure source; first means responsive to a pressure increase in said support means of a predetermined magnitude to cut off a pressure increase to said second series of friction elements; and second means engaging said support means and a fixed portion of the vehicle and including opposed force inducing means, each of said opposed force inducing means being responsive to a servo action generated under different operating conditions to intensify the pressure on said second series of friction elements.

3. Disc brake mechanism for a vehicle, said mechanism comprising: a disc carried for rotation by a wheel of the vehicle; support means having fluid passages therein carried by a non-rotatable portion of the vehicle in caliper fashion relative to an outer periphery of said disc; a fluid pressure source communicating fluid pressure to said support means; a first series of piston means including friction elements slidable in said support means into frictional engagement with said disc; a second series of piston means carrying friction elements in fluid communication with said first series of piston means and slidable into engagement with said disc; valve means disposed in a fluid communicating passage between said first and second series of piston means and arranged to shut off pressure to said second series of piston means in response to a pressure buildup in said fluid pressure source of a predetermined magnitude; and actuating means engaging said support means and a fixed portion of the vehicle, said actuating means including opposed piston means slidable in the passage communicating pressure from said first series of piston means to said second series of piston means in response to a servo action generated by the first and second series of piston means contacting the disc during rotation thereof, said actuating means intensifying the pressure on said second series of piston means to assist in a braking action.

4. Disc brake mechanism according to claim 3 wherein said valve means is adapted to slide in a passage provided therein in response to a pressure increase in said fluid pressure source to shut off further pressure increase to said second series of piston means, said valve means maintaining thereby a differential pressure between said first and second series of piston means during periods of pressure buildup in said fluid pressure source.

5. Disc brake mechanism according to claim 3 wherein the actuating means is a link slidable through one wall of said support means engaging a fixed portion of the vehicle on one end and carrying biased opposed pistons on another end, said biased opposed pistons being slidably carried in a communicating passage between said first and second series of piston means to intensify pressure thereto regardless of direction of rotation of the rotatable disc during a servo action generation.

6. Disc brake mechanism for a vehicle, said mechanism comprising: caliper type support means rotatably carried by a fixed portion of the vehicle; a disc carried for rotation by a wheel of the vehicle and having the outer periphery of said disc passing through said caliper type support means in juxtaposition thereto; piston means carrying friction elements slidable in portions of said caliper type support means in a manner maintaining the friction elements in juxtaposition to the rotatable disc; a fluid pressure source communicating pressure to said piston means and arranged to slide said piston means in their operative location toward said disc whereby the friction elements carried thereon frictionally engage the disc to provide a braking action; a fluid passage connecting a first series of said piston means to a second series of said piston means; a valve slidably disposed in said fluid passage to selectively close said passage in response to a pressure buildup of a predetermined magnitude from said fluid pressure source; and link means engaging a fixed portion of the vehicle and said caliper type support means to yieldably position said support means relative to the rotatable disc, said link means being slidable through one wall of the caliper type support means and including a portion of smaller diameter slidably carrying opposed pistons biasedly centered in said fluid passage; said opposed pistons being selectively movable in said passage to intensify the pressure acting upon several of said piston means as the caliper type support means moves relative to the rotatable disc in response to a servo action generated by the friction elements contacting the rotatable disc.

7. Disc brake mechanism according to claim 6 wherein the link means comprises a shaft carrying a larger diameter and said smaller diameter, and a passage formed as an enlarged portion of the fluid communicating passage between the first and second series of piston means, a pair of opposed pistons slidable on the smaller diameter of said shaft and retained thereon against the biasing force of a spring interposed therebetween, said larger diameter portion of said shaft engaging a fixed portion of the vehicle and being relatively fixed with relationship thereto, said pistons being selectively slidable in said chamber in response to movement of the caliper type support means to effectively decrease the size of the chamber thereby intensifying the pressure available to several of said piston means in response to servo action generated between the friction elements and the rotating disc.

References Cited by the Examiner

UNITED STATES PATENTS

| 2,494,319 | 1/1950 | Swan | 188—141 |
| 3,144,920 | 8/1964 | Price | 188—152 |
| 3,167,158 | 1/1965 | Brownyer | 188—141 |

FOREIGN PATENTS

| 951,602 | 3/1964 | Great Britain. |

MILTON BUCHLER, *Primary Examiner.*

G. E. A. HALVOSA, *Assistant Examiner.*